(Model.)

F. A. PALMER.
WASH BASIN.

No. 253,551. Patented Feb. 14, 1882.

Attest:
E. L. Palmer
John H. Keyser

Inventor:
Fred. A. Palmer

UNITED STATES PATENT OFFICE.

FRED. A. PALMER, OF MONTMORENCI, SOUTH CAROLINA.

WASH-BASIN.

SPECIFICATION forming part of Letters Patent No. 253,551, dated February 14, 1882.

Application filed March 22, 1879. Renewed July 2, 1881. (Model.)

*To all whom it may concern:*

Be it known that I, FRED. A. PALMER, of Montmorenci, in the county of Aiken and State of South Carolina, have invented a new and useful Improvement in Plumbers' Basins or Bowls and Fluid-Traps for Excluding Sewer-Gas, of which the following is a specification.

The invention relates to plumbers' wash-basins and traps for the same.

Heretofore plumbers' wash-basins and traps for the same have been constructed separately of different materials and then connected for use by means of solder and the use of several couplings, at once unmechanical and costly.

The object of my invention is to construct a plumber's basin or bowl with an overflow, a strainer for the wasteway, a non-siphonable fluid gas-trap having a cleaning-out place in its bottom, a wasteway from the bowl, forming the inlet-arm of the trap, together with the outlet-arm of the trap, the same being the waste-pipe from the trap to discharge into the house-sewer line, all in one piece of crockery or Delft ware, said outlet-arm being constructed to receive a brass coupling, which coupling suffices to connect my basin to the house sewer-pipe with only one joint, thus getting rid of the use of other couplings or devices now in use, and securing absolute immunity from sewer-gas without other traps than the one forming a part of my combination-bowl.

Figure 1:
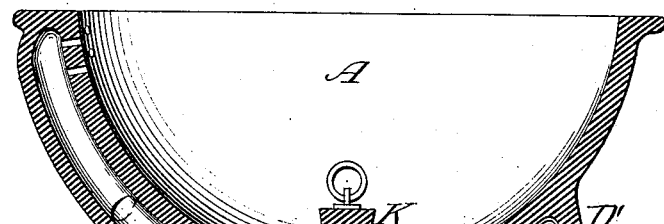
Figure 2:
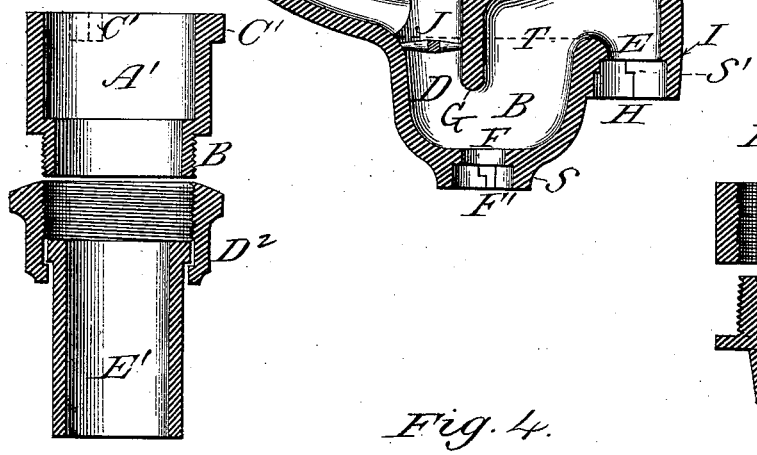
Figure 3:
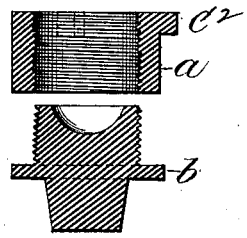
Figure 4:
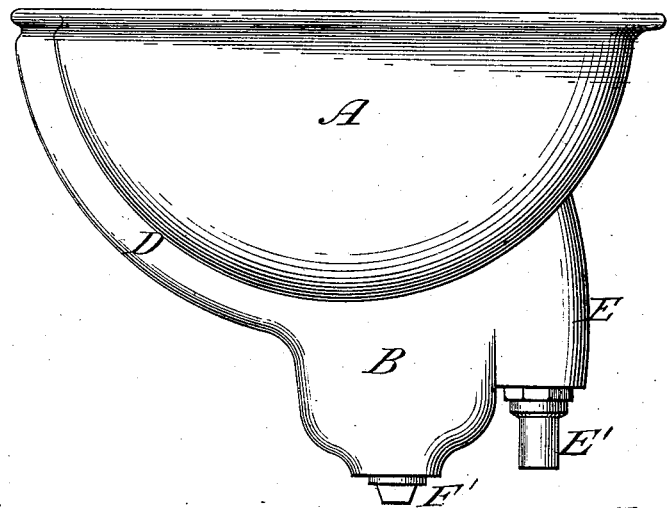

In the accompanying drawings, in which similar letters of reference indicate like parts, Figure 1 represents an interior sectional view in detail of my basin and trap. Fig. 2 represents the brass coupling in two parts. Fig. 3 is the trap-screw. Fig. 4 is a side view of my combination basin or bowl.

The basin A is made of Delft or crockery ware, and from its under outer surface extends an overflow, c, and a trap having a waste-passage, E, and a cleaning-out passage, F. The trap is provided with a vertical bridge, G, and this bridge is integral with the basin, and extends down into the chamber B to a point below the top of the waste-outlet passage E. The entrances from the bottom of the basin and from the rim thereof through the overflow-passage c into the trap-chamber B are partly closed by a strainer, J, which is integral with the basin. The trap-chamber and the waste-passage are formed by integral extensions of the basin, as shown at D and D' in the sectional drawings, Fig. 1.

The bridge G is located about midway of the chamber B, and said chamber is made of a size much greater than the discharging area of the passage E, and by this means the stench from sewer-gas is prevented from escaping into the basin, the enlarged chamber rendering it almost impossible for the water which flows into the trap, and into which the lower end of the bridge dips, to be siphoned out of the trap through the relatively small discharge or waste passage E.

The basin is provided with the usual bottom plug, K, and the trap is provided with a screw-plug, b, and a screw-coupling ring, a. The ring a has small lugs $C^2$, which pass up into bayonet fastening-slots S, formed in the enlarged socket F', which is formed on the lower end of the trap around the cleaning-out passage F. By screwing the flanged plug b into the screw-ring a, and then inserting the lugs into the slots (at S) of the socket F', and turning the whole until the lugs bind tightly in the horizontal portions of the slots, the cleaning-out passage will be closed, and whenever necessary may be opened and cleaned out by turning down the flanged plug b.

In the extension D' of the basin, below the mouth of the escape-passage E, a socket, H, is provided, so as to form a stop-shoulder, I, and in the sides of this socket bayonet fastening-slots, as at S', are formed, into which lugs C' of a coupling, A', fit, and are fastened in the same manner as in the case of the lugs $C^2$ of the screw-ring a, hereinbefore described. By means of this coupling A' and a screw-ring, $D^2$, and a shoulder on the pipe E' leading to the house-sewer, a connection between the basin and the sewer can be readily effected.

It will be understood that the basin described, consisting of bowl A, overflow C, trap B, bridge G, strainer J, cleaning-out and waste passages F and E, and coupling-sockets F' and H, is made in one piece—that is, the different parts mentioned are integral with one another and of the same material.

It will also be understood that the trap, by having its holding capacity enlarged at the side next to the outlet E, presents a larger surface of liquid next to said outlet than it does on the side adjacent to the inlet of the trap, and that consequently the trap is non-siphonable under ordinary circumstances or uses, and therefore the water will be maintained about on the line T and gas prevented passing under the bridge G thereby.

What I claim as my invention is—

1. The one-piece Delft or crockery ware basin with its overflow C, strainer J, trap B and G, and coupling-sockets F' H, constructed substantially as and for the purpose described.

2. The combination of the ring $a$ and plug $b$ with the basin provided with the trap B and socket F', having slots at S, substantially as and for the purpose described.

FRED. A. PALMER.

Witnesses:
JOHN H. KEYSER,
JAMES GRABURN.